Aug. 6, 1935.   D. W. DORRANCE   2,010,751
ARTIFICIAL HAND
Filed March 27, 1933   2 Sheets-Sheet 1
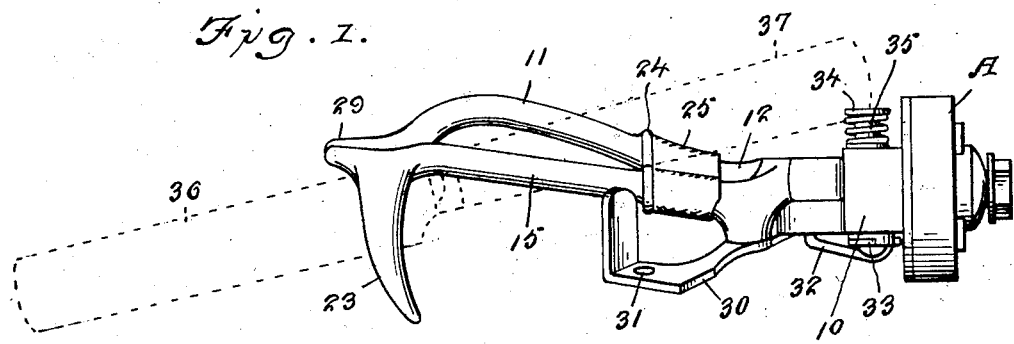
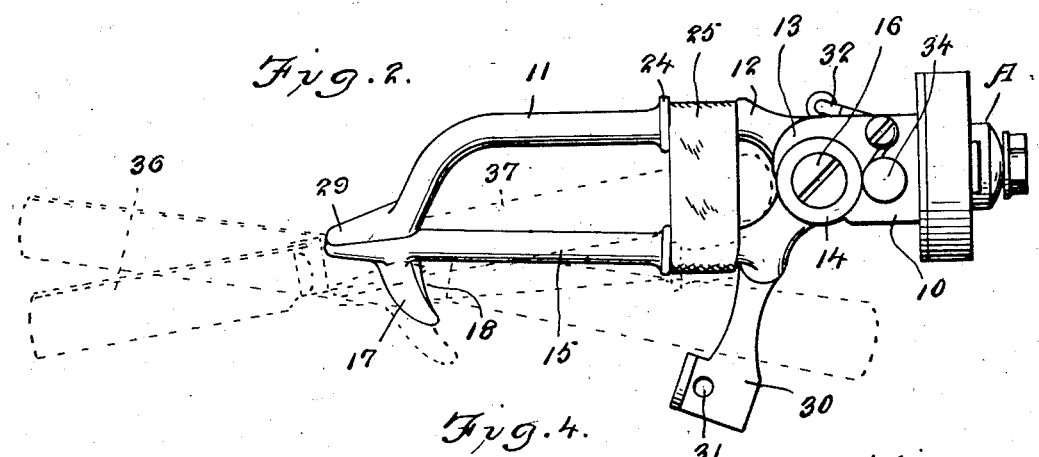
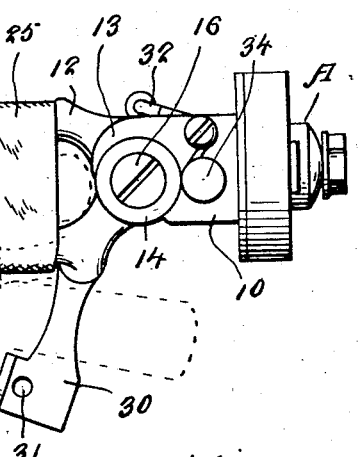
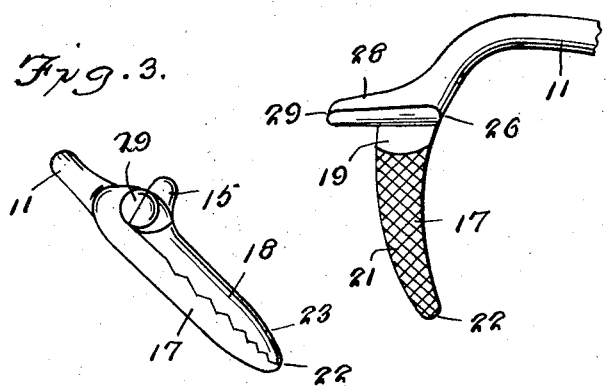
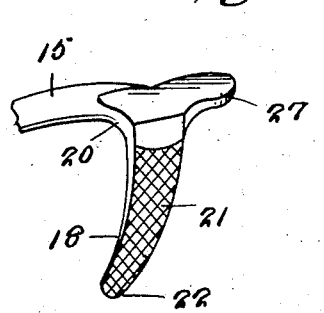

Aug. 6, 1935.  D. W. DORRANCE  2,010,751
ARTIFICIAL HAND
Filed March 27, 1933   2 Sheets-Sheet 2
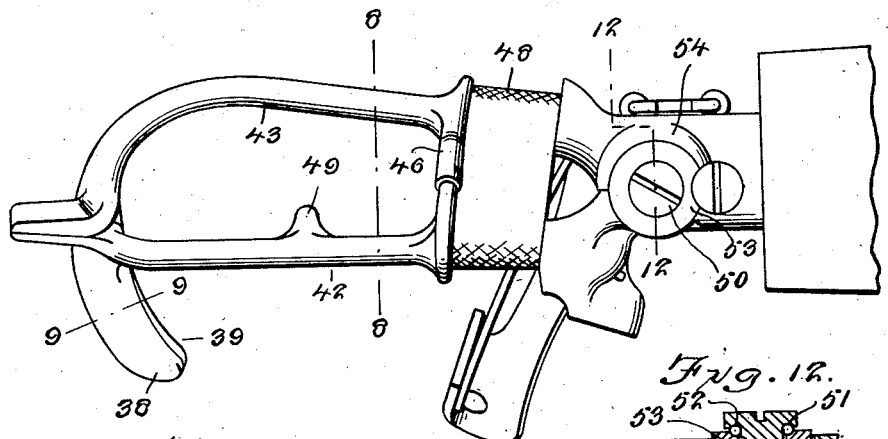
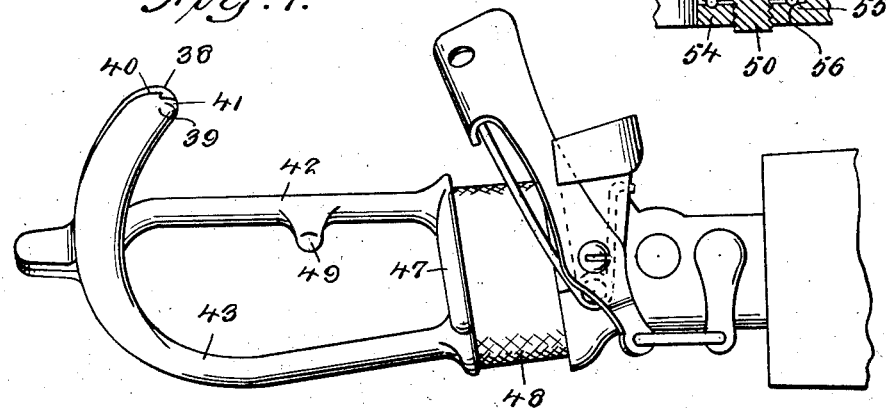
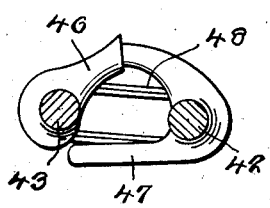
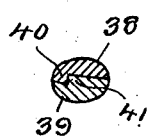
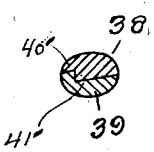
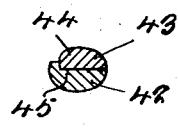
David W. Dorrance
INVENTOR
BY Victor J. Evans & Co.
ATTORNEY Patented Aug. 6, 1935

2,010,751

UNITED STATES PATENT OFFICE 2,010,751

ARTIFICIAL HAND

David W. Dorrance, San Jose, Calif.

Application March 27, 1933, Serial No. 663,037

1 Claim. (Cl. 3—12)

The invention relates to an artificial hand and more especially to a jaw hook as a natural hand substitute where the amputation of the hand of a person has taken place.

The primary object of the invention is the provision of a structure of this character wherein there are arranged relatively movable fingers or jaws, these being so bent or shaped and carrying thumbs or protuberances so positioned as to effect cooperation with the fingers or jaws, whereby a table knife can be grasped and manipulated in a natural manner for the purposes intended thereof.

Another object of the invention is the provision of a structure of this character, wherein the table knife, spoon, fork or other implement of a like nature may be conveniently held and manipulated without liability of displacement or the working loose thereof, and in the holding of a knife the pitch of its blade can be regulated for cutting purposes as in carving or the cutting of meats or so held that it can be jabbed or pierced.

A further object of the invention is the provision of a structure of this character, wherein the fingers and adjunct portions thereof are so shaped and arranged as to enable the firm and secure grasping of cutlery or table implements and sustained in workable position for the convenient use thereof, the construction being novel in form and thereby affording a substitute for the natural hand to meet the requirements of the latter without inconvenience or awkwardness resulting from the artificial characteristic of the same.

A still further object of the invention is the provision of a construction of this character wherein wire, thread, cord or other wire-like or cord-like material can be conveniently grasped and held without slippage to an equal degree as may be had by the use of the natural hand, the construction also functioning for the holding and manipulation of varying instruments or implements, as well as nails to be driven by a hammer or any article that may be conveniently held by the natural hand.

A still further object of the invention is the provision of a construction of this character which is an improvement over the subject matter of U. S. Patent #1,846,954, dated February 23, 1932, with niceties in the refinement thereof and in the formation of certain parts or adjuncts so as to materially better the working conditions and assure firm gripping qualities of various articles and in the operation of the same.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a side elevation of an artificial hand or hook constructed in accordance with the invention showing therein by dotted lines a table knife held for use in cutting material such as meat or edibles.

Figure 2 is a top plane view thereof showing by dotted lines a table knife in several positions, one being for jabbing or piercing action and the other a cutting position.

Figure 3 is an outer end elevation.

Figure 4 is a fragmentary elevation of one of the fingers at its tip.

Figure 5 is a view similar to Figure 4 showing the other finger at its tip.

Figure 6 is a plan view of a slight modification.

Figure 7 is a view similar to Figure 6 looking toward the opposite side thereof.

Figure 8 is a sectional view on the line 8—8 of Figure 6.

Figure 9 is a sectional view on the line 9—9 of Figure 6.

Figure 10 is a view similar to Figure 9 showing a slight modification of the meeting faces of the tips.

Figure 11 is a view similar to Figure 10 showing a still further modification of the meeting faces of the tips.

Figure 12 is a sectional view on the line 12—12 of Figure 6.

Similar reference characters indicate corresponding parts throughout the several views in the drawings.

Referring to the drawings in detail, particularly Figures 1 to 5 thereof, the artificial hand or natural hand substitute comprises a coupling A adapted for detachable fastening with a stump member of any conventional form, which latter is designed for connection with an arm after amputation of the hand or a part of said arm, the coupling A being no part of the present invention and being shown merely to identify a mode or method of attachment of the artificial hand or hand substitute.

The coupling A carries as a part thereof a block 10 constituting what might be termed a head and is formed with a stationary finger 11, the major portion thereof being relatively straight while the adjoining inner end 12 of said finger is outwardly curved to offset the same from the block or head 10, the latter being cut away at one side to provide a pivot ear 13 for the mounting therewith of the pivot end 14 of a movable finger 15, the latter for a major portion of its length being gradually curved and its ear 14 receiving a pivot 16, the latter being engaged in the ear 13 and in this manner the said finger 15 is swingingly related to the stationary finger 11.

The fingers 11 and 15 carry hook-like tips 17 and 18 respectively, they being integral therewith and the tip 17 is cut into at its inner side to provide a seat 19 for the tip 18 which is offset by the bight 20 from the finger 15; the inner faces of said tips 17 and 18 are serrated or roughened at 21 to provide firmly gripping surfaces thereto and these surfaces are in confronting relation to each other. The seat 19 in the tip 17 closely accommodates the tip 18 when the finger 15 is closed or swung toward the finger 11. These tips 17 and 18 are curved in a matched relation to each other and are disposed at an acute lateral angle to the fingers 11 and 15 with their free ends rounded at 22 and likewise the outer surfaces 23 of such tips are rounded and smooth of finish.

Formed on the fingers 11 and 15 close to the pivot 16 connecting the swinging finger are shoulders 24 for abutment therewith of an endless elastic band 25, the latter encircling both fingers 11 and 15, the band being relatively wide and constituting a tensioning medium for urging the movable finger 15 toward the stationary finger 11 for the positive closing or bringing together of these fingers and upon the opening thereof or the separation of said fingers the band 25 will tension the same and operate the movable finger 15. The shoulders 24 prevent the working outwardly of the band 25 on the fingers 11 and 15 in the direction of the free ends or tips 17 and 18 thereof.

At the bight 20 between the tip 18 and finger 15 and also at the meeting point 26 of the finger 11 with said bight are outwardly projecting stubs or protuberances 27 and 28 respectively, these gradually tapering outwardly and being formed with rounded ends 29. When the finger 15 is in closed position with respect to the finger 11 the stubs or protuberances are in contact with each other and in parallelism so as to match one with the other and the purpose thereof will be hereinafter fully described.

The movable finger 15 is actuated and controlled by a trigger 30 having an eye 31 for the attachment thereto of a pull cord, the trigger being pivotally mounted at the inner end 12 of the movable finger 15 and operating a link 32 loosely connected therewith, which link is also loosely connected to a lever 33 on a stud rock shaft 34 operating as an eccentric and this shaft cooperates and in its construction corresponds with the subject matter of U. S. Letters Patent #1,846,954, dated February 23, 1932, the shaft 34 being tensioned by a spring 35 anchored thereto and also to the block 10. The working of this shaft 34 and its association with the pivot end of the finger 15 is clearly defined and set forth in the aforesaid patent and constitutes no part of the present invention.

On operation of the movable finger 15 the table knife 36, that is, the handle 37 thereof can in one instance be interposed between the fingers 11 and 15 as is shown in Figure 1 of the drawings so that the blade or knife 36 can be grasped firmly between the tips 17 and 18 with the handle 37 angularly disposed and saddled upon the band 25', thus in this position the said knife can be conveniently operated for cutting purposes.

In Figure 2 of the drawings the knife 36 has its handle seated between the inner end of the fingers 11 and 15 with the handle grasped by the tips 17 and 18 and in this position such knife can be used for jabbing or piercing purposes. In both instances of the grasping of the knife as in Figures 1 and 2 of the drawings, the heel edge of such knife will constitute a fulcrum against the portion 26 of the stationary finger 11, while the movable finger 15 under the action of the band 25 will be forced against such knife and the tips 17 and 18 of these fingers will firmly and securely grasp the knife to positively hold the same under manipulation thereof in the use of the same.

In Figure 2 the knife 36 is shown resting crosswise upon the trigger 30 with the blade of such knife grasped or gripped between the tips 17 and 18, these forming pincers and it should be obvious that a nail or implement, of hand operable type can be firmly pinched or grasped by the tips for the secure holding thereof, the serrated or roughened faces 21 of said tips being effective to prevent any possible slipping of the part or article held by the artificial hand or natural hand substitute. The stubs 27 and 28 also constitute grippers, pincers and abutments for articles to be grasped and held by the fingers 11 and 15 of the artificial hand.

The opening and closing of the finger 15 is automatically accomplished by operating the trigger 30, the latter being controlled by a pull cord or cable which is manipulated by shoulder or arm movement of the wearer of the artificial hand.

In Figures 6 to 11 of the drawings there is showing a slight modification of the invention, wherein the tips 38 and 39 respectively, these corresponding to the tips 17 and 18, have their inner faces, in the direction of the length thereof, cut into to provide overlapped interfitting shoulders 40 and 41 and 40' and 41' respectively, as in Figures 9 and 10 while the fingers 42 and 43 respectively, which are the equivalent to the fingers 11 and 15, have their inner faces immediately next to the tips 38 and 39 shaped at 44 and 45 as in Figure 11 for the overlapped and interfitting relationship as effected at the shoulders 40 and 41 and the purpose of this interfitting and overlap is to enable a wire, cord, cable or other like article to be grasped and firmly held against slippage when engaged by the artificial hand.

The fingers 42 and 43 at their inner ends are formed with guard prongs 46 and 47 respectively, these being protective for the rubber band or bands 48, while the finger 42 carries a knob, bump or protuberance 49, the latter functioning as the joint of the thumb of a natural hand to provide a fulcrum or rest at this point of the finger.

It is of course to be understood that the shape of the shoulders 40, 41, 40', 41', 44 and 45 may be varied so as to function in a positive manner for the grasping or gripping of the articles heretofore named, as well as paper, cloth or anything of sheet kind. This shoulder formation at the tips 38 and 39 materially strengthens the same. The prongs 46 and 47 in addition to serving as guards will also constitute a rest or an abutment for articles which when grasped in the artificial hand will be prevented from contact with the rubber band or bands 48 and thus eliminate damage thereto.

The pivot 50 which is similar to the pivot 16 has located beneath its head a series of anti-friction balls 51, these traveling in a suitable raceway 52 formed in the head of the pivot and the adjacent pivotal end 53 of the finger 42. Likewise, between the end 53 and the companion portion 54 of the finger 43 is a series of anti-friction balls 55, these traveling in a raceway 56 in said companion portion of the finger 43. Thus it will be seen that this pivotal joint eliminates all friction in the working of the pivoted finger so that there is no liability of resistance at the pivot or the possibility of the sticking of the pivotal finger, it being freely movable.

What is claimed is:—

In an artificial hand of the character described, stationary and movable fingers offset with relation to each other, the movable finger being substantially straight and the stationary finger being curved outwardly, hook-like tips at the outer ends of said fingers and disposed lengthwise of each other, contacting stubs projected outwardly from said tips and parallel with the straight finger when in contacting relation to each other, the tip of the stationary finger being disposed crosswise of the tip of the movable finger, irregular formations on the confronting faces of the tips and coextensive with the lengths thereof for the overlapping of the fingers with each other when brought together, and prongs approaching each other and formed on the fingers close to the inner ends of said fingers.

DAVID W. DORRANCE.